US006571102B1

(12) United States Patent
Hogberg et al.

(10) Patent No.: US 6,571,102 B1
(45) Date of Patent: May 27, 2003

(54) CHANNEL MANAGEMENT TECHNIQUE FOR ASYMMETRIC DATA SERVICES

(75) Inventors: Shawn Hogberg, Chandler, AZ (US); Daniel R. Tayloe, Phoenix, AZ (US); James Powers Redden, Mesa, AZ (US)

(73) Assignee: Motorola, Inc., Schaumburg, IL (US)

( * ) Notice: Subject to any disclaimer, the term of this patent is extended or adjusted under 35 U.S.C. 154(b) by 380 days.

(21) Appl. No.: 09/634,426

(22) Filed: Aug. 8, 2000

(51) Int. Cl.[7] .................................................. H04Q 7/20
(52) U.S. Cl. ...................... 455/450; 455/509; 455/436; 370/329
(58) Field of Search ................................ 455/509, 450, 455/452, 427, 12.1, 436–439, 442, 527, 561; 370/319, 329, 331, 335, 468, 465

(56) References Cited

U.S. PATENT DOCUMENTS

| 5,574,968 | A | | 11/1996 | Olds et al. ................. 455/12.1 |
| 6,018,662 | A | * | 1/2000 | Periyalwar et al. ......... 455/442 |
| 6,049,721 | A | * | 4/2000 | Serizawa et al. ............ 455/509 |
| 6,115,750 | A | * | 9/2000 | Dillon et al. ................ 709/235 |
| 6,205,473 | B1 | * | 3/2001 | Thomasson et al. ......... 709/217 |
| 6,243,582 | B1 | * | 6/2001 | Lahtinen ..................... 455/436 |
| 6,327,300 | B1 | * | 12/2001 | Souissi et al. .............. 375/219 |
| 6,351,469 | B1 | * | 2/2002 | Otani et al. ................. 370/459 |

FOREIGN PATENT DOCUMENTS

EP    0954146    * 11/1999    .......... H04L/29/06

* cited by examiner

*Primary Examiner*—Duc Nguyen
(74) *Attorney, Agent, or Firm*—Frank J. Bogacz (57) ABSTRACT

A narrowband communication system provides wideband data services in a secondary service band. This limits the impact on primary services in peak traffic regions in that the primary service band is not required to download wideband data from a communication node (e.g., a satellite) to a mobile terminal. The narrowband communication system implements a handoff protocol (400) that rate negotiates a channel bandwidth of an active connection (404) to the amount of channels that are available in a new cell. The narrowband communication system preempts (414) lower priority subscribers when a higher priority (408) high-speed data terminal requires access to the system and a requested channel assignment is not available (412). The complexity of a high-speed data terminal communication chipset is reduced by a receiver design that minimizes the range of frequencies that are required to be demodulated.

26 Claims, 4 Drawing Sheets

CHANNEL MANAGEMENT TECHNIQUE FOR ASYMMETRIC DATA SERVICES

BACKGROUND OF THE INVENTION

1. Field of the Invention

The present invention is generally directed to a narrowband communication system, and more particularly to a channel management technique for providing asymmetric wideband data services with a narrowband communication system.

2. Background Information

The allocation of frequency spectrum, available to a given communication system, is currently controlled on a worldwide, country by country, basis. As such, the amount of frequency spectrum that is available to a given communication system (e.g., satellite and terrestrial-based cellular) can potentially limit the capacity of the system. For example, a typical satellite communication system allocates channels for voice services, low-speed data services and system overhead channels (e.g., broadcast and acquisition channels) in a primary service band. Currently, there is a demand to use such systems for other services, such as, high-speed data services. However, implementing high-speed data services can significantly impact the ability of the communication system to carry primary services, such as voice subscriber traffic, in regions with heavy peak traffic.

Interlacing wideband data services, with narrowband services, can create channel and connection management problems that are not normally experienced when only narrowband services (e.g., voice services) are provided. Additional capacity needed for wideband services is virtually non-existent in the primary service band of most conventional narrowband communication systems, due to the amount of frequency spectrum already consumed by voice services, low-speed data services and system overhead channels.

Due to the limited bandwidth of most narrowband communication systems, it is also difficult to find spectrum in which to allocate channels in a handoff cell such that true make-before-break handoffs can be accomplished, when wideband services that utilize multiple narrowband channels are provided. In particular, if there are more than a few high-speed data terminal subscribers in a local region, the task becomes increasingly difficult.

Many high-speed data terminals require a guaranteed minimum bandwidth, because of the application in which they are used. For example, U.S. government regulations require a guaranteed bandwidth for a communication system that offers aeronautical safety data services. An aeronautical safety data terminal may function as a flight recorder and provide flight data on an airplane in which it is located. This flight data may be routed through a satellite constellation, of a communication system, to an appropriate ground station. The aeronautical safety data terminal may also communicate weather related information and facilitate airplane-to-airplane communication. Unfortunately, current narrowband communication systems typically lack the ability to provide reliable guaranteed service to such high-speed data terminals.

Additionally, the communication chipset of a high-speed data terminal can become quite complex when the receiver of the terminal is required to tune across a wide range of frequencies.

BRIEF DESCRIPTION OF THE DRAWINGS

The present invention will hereinafter be described in conjunction with the appended drawing figures, wherein like numerals denote like elements, and.

DETAILED DESCRIPTION OF THE PREFERRED EXEMPLARY EMBODIMENT(S)

The ensuing detailed description provides preferred exemplary embodiments only, and is not intended to limit the scope, applicability or configuration of the invention. Rather, the ensuing detailed description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

Embodiments of the present invention are directed to techniques that allow a narrowband communication system to provide asymmetric wideband data services. As used herein, a "wideband" channel generally includes a plurality of "narrowband" channels. For example, if a narrowband channel is a voice channel with a bandwidth of 4 kHz or less, then a wideband channel would have a bandwidth of at least about 8 kHz (i.e., two narrowband channels). According to one embodiment of the present invention, all downlink wideband channel assignments are made in a secondary service band. This tends to limit the impact on primary services in peak traffic regions in that the primary service band is not required to download wideband data from a communication node, e.g., a satellite, to a high-speed data terminal. As used herein, the term "high-speed data terminal" includes a data terminal that provides wideband services and the term "high-speed data" generally refers to wideband data. According to another embodiment of the present invention, a handoff protocol rate negotiates a channel bandwidth of an active connection to the amount of channels that are available in a new cell (e.g., one channel).

According to yet another embodiment of the present invention, preemption of lower priority subscribers is facilitated by special acquisition class designations (provided in an acquisition message) that allow higher priority high-speed data terminals to be identified by the communication system. In another embodiment, the complexity of a high-speed data terminal communication chipset is reduced by a receiver design that minimizes the range of frequencies that are required to be demodulated. One receiver design utilizes a single time-slot of multiple contiguous channels. Another receiver design utilizes multiple time-slots of a single channel. Yet another receiver design utilizes multiple time-slots of multiple contiguous channels. While the discussion herein is primarily directed to satellite communication systems, one of ordinary skill in the art will appreciate that the disclosed techniques are applicable to other communication systems (e.g., terrestrial-based cellular systems) that integrate wideband services with narrowband services.

As utilized herein, the term "satellite" includes a man-made object or vehicle for orbiting a celestial body, such as the Earth, and encompasses both geostationary and orbiting satellites. As used herein, the term "constellation" includes a group of satellites arranged in orbits for providing coverage (e.g., radio communication) over a portion or all of a celestial body and may include geostationary satellites, orbiting satellites (i.e., low-Earth orbiting (LEO) satellites and medium Earth orbiting satellites) or combinations of such satellites. A constellation typically includes multiple rings (or planes) of satellites and may have equal numbers of satellites in each plane. The term "cell" and "antenna pattern" are not intended to be limited to any particular mode of generation and includes those created by either terrestrial or satellite cellular communication systems and/or combinations thereof.

Figure 1:
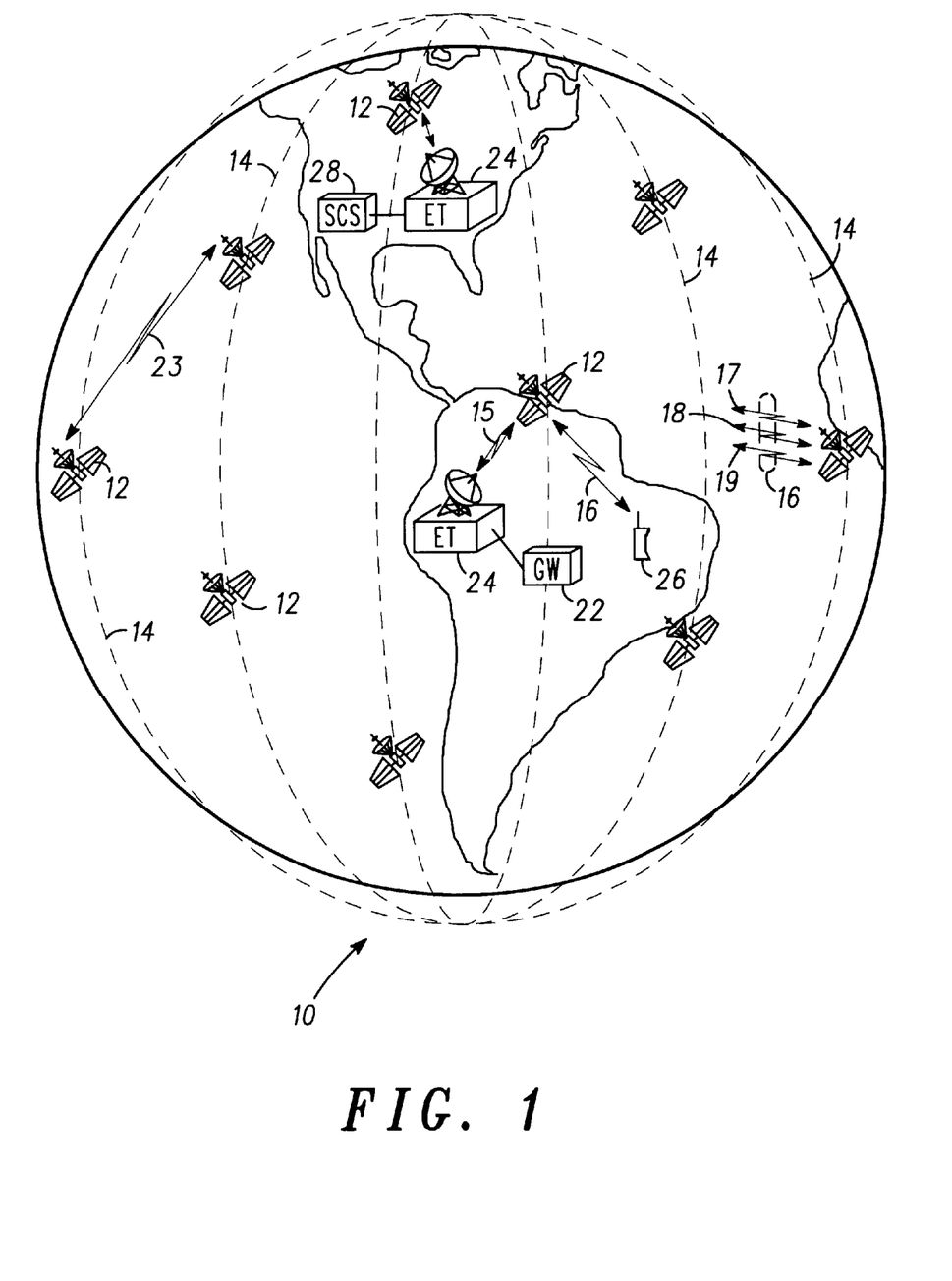
FIG. 1 is a simplified diagram of a satellite-based narrowband communication system, according to an embodiment of the present invention.

FIG. 1 illustrates a simplified diagram of a communication system 10 that includes a plurality of orbiting satellites 12 occupying a plurality of polar orbits 14. The present invention is also applicable to satellite communication systems that have non-polar orbits (e.g., equatorial). While only nine satellites 12 and six polar orbits 14 are shown in FIG. 1, one of ordinary skill in the art will appreciate that any number of satellites or orbits may be utilized to provide a desired coverage.

When satellites 12 are LEO satellites, a line-of-sight electromagnetic (e.g., radio and light) communication of any one satellite 12 covers a relatively small area of the Earth, at any instant. A typical LEO satellite 12 travels at approximately twenty-five thousand kms/hr with respect to the Earth. As such, each satellite 12 is visible to a terrestrial station, such as individual subscriber unit (ISU) 26, for a period of approximately nine minutes, according to the system shown.

Each satellite 12 communicates with terrestrial stations, which may include some number of ISUs 26 and Earth terminals (ETs) 24 connected to a system control segment (SCS) 28 or a gateway (GW) 22. Each GW 22 may provide access to a public switched telephone network (PSTN) (not shown in FIG. 1) or other communication facility. ETs 24 may be adjacent to or separate from SCSs 28 and/or GWs 22. ETs 24 that are associated with SCSs 28 receive data describing tracking of satellites 12 and relay packets of control information. ETs 24 associated with GW 22 typically only relay data packets (e.g., relating to calls in progress).

ISUs 26 may be located anywhere on the surface of the Earth or in the atmosphere above the Earth, such as aboard an airplane. ISUs 26 are preferably communication devices capable of transmitting data to and receiving data from satellites 12. By way of example, ISU 26 may be a hand-held portable cellular telephone adapted to communicate with satellites 12. Normally, ISU 26 does not perform any control functions for communication system 10.

Communication system 10 may accommodate a large number of ISUs 26, which typically communicate with nearby satellites 12 via subscriber links 16. Links 16 encompass a limited portion of the electromagnetic spectrum that is divided into numerous channels. For example, links 16 may be combinations of L-band frequency channels and may encompass various air interface standards (e.g., Frequency Division Multiple Access (FDMA), Time Division Multiple Access (TDMA), Code Division Multiple Access (CDMA)) or a combination of such air interface standards. At a minimum, satellite 12 regularly transmits over one or more broadcast channels 18. ISUs 26 synchronize to broadcast channels 18 and monitor broadcast channels 18 to detect messages which are addressed to them. ISUs 26 transmit messages to satellites 12 over one or more acquisition channels 19. Broadcast channels 18 and acquisition channels 19 are typically not dedicated to any one ISU 26, but are shared by all ISUs 26 currently within the footprint of a given satellite 12.

Traffic channels 17 are typically two-way real-time channels that are assigned to a particular ISU 26, by a given satellite 12, from time-to-time. Preferably, a digital format is used to communicate data over channels 17–19. At least one traffic channel 17 is assigned for each call, and each traffic channel 17 has sufficient bandwidth to support, at a minimum, a two-way voice conversation. To support real-time communications, a TDMA scheme may be used to divide time into frames (e.g., ten to ninety milliseconds). In such a scheme, each ISU 26 is assigned a specific traffic channel 17 and specific transmit and receive time-slots within each frame of the specific traffic channel 17. Analog audio signals are preferably digitized such that during each frame, the digitized audio signal is transmitted or received in a single short high-speed burst during an allotted time-slot. Each satellite 12 may support up to a thousand or more traffic channels 17 such that each satellite 12 can simultaneously service a number of independent calls. Those of ordinary skill in the art will appreciate that traffic channels 17 can be formed without a time-slot structure and that methods that do not require digitizing an analog signal (e.g., voice) may be employed. Various known techniques may be employed to form the channels and process the voice communication.

Satellites 12 communicate with other nearby satellites 12 through cross-links 23. Thus, a call or communication from an ISU 26 located at any point on or near the surface of the Earth may be routed through the constellation of satellites 12 to within range of substantially any other point on the surface of the Earth. A communication may be routed down to an ISU 26 on or near the surface of the Earth from a satellite 12 using subscriber link 16. Alternatively, a communication may be routed down to or up from ETs 24, of which FIG. 1 shows only two, through Earth links 15. ETs 24 are usually distributed over the surface of the Earth in accordance with geographical/political boundaries. Each satellite 12 is preferably capable of communicating with multiple ETs 24 and ISUs 26 at any given instant.

SCS 28 monitors the health and status of system communication nodes (e.g., GWs 22, ETs 24 and satellites 12) and normally manages operations of communication system 10. One or more ETs 24 provide the primary communications interface between SCS 28 and satellites 12. ETs 24 typically include antennas and RF transceivers for performing telemetry, tracking and control functions for the constellation of satellites 12.

GWs 22 may perform call processing functions in conjunction with satellites 12 or GWs 22 may exclusively handle call processing and allocation of call handling capacity within communication system 10. Various terrestrial-based communication systems, such as, the PSTN (not shown), may access communication system 10 through GWs 22.

When the Earth is fully covered by satellites 12, any satellite 12 may be in direct or indirect data communication with any ISU 26 or ET 24 at any time by routing data through the constellation of satellites 12. Accordingly communication system 10 may establish a communication path for relaying data through the constellation of satellites 12 between any two ISUs 26, between SCS 28 and GW 22, between any two GWs 22 or between ISU 26 and GW 22. The present invention is also applicable to satellite constellations where full coverage of the Earth is not achieved (i.e., where there are "holes" in the communications coverage provided by the constellation) and constellations where plural coverage of portions of the Earth occur (i.e., more than one satellite is in view of a point on the Earth's surface).

In general terms, communication system 10 may be viewed as a network of nodes. Each satellite 12, GW 22, SCS 28 and ISU 26 represents a node of communication system 10. All nodes of communication system 10 are or may be in data communication with any other node of communication system 10, through communication links 15, 16 and/or 23. In addition, all nodes of communication system 10 are or may be in data communication with other telephonic devices dispersed throughout the world through PSTNs and/or conventional terrestrial cellular telephone devices coupled to a PSTN through conventional terrestrial-based stations.

As discussed previously, satellite 12 continuously transmits over one or more broadcast channels 18. ISUs 26 synchronize to broadcast channels 18 and monitor the broadcast channels 18. Preferably, each ISU 26 continually monitors the broadcast channel 18 of the cell in which it is located. Broadcast channels 18 are not dedicated to any one ISU 26, but are shared by all ISUs 26 currently within the footprint of a given satellite 12. In systems that utilize satellites 12 in non-geosynchronous orbits, broadcast channel 18 antenna patterns travel across the surface of the Earth, while ISUs 26 remain relatively stationary. In systems that utilize satellites 12 in geosynchronous orbits, the antenna patterns dedicated to broadcast channel 18 are relatively stationary, while ISUs 26 travel across the surface of the Earth.

Assignments of traffic channels 17 are valid while an ISU 26 remains within a given cell. Generally, based on the movement of a given satellite 12, this period is approximately thirty seconds, according to one example. New traffic channel assignments must be established every period. Because of the fast moving antenna patterns, it is desirable for ISUs 26 to monitor the broadcast channels 18 of adjacent cells that are candidates for handoff. Typically, each ISU 26 is capable of operating with any of the discrete channel sets, and the particular channel set used at any particular time by any particular ISU 26 is controlled by communication system 10.

ISU 26 typically determines which cell to communicate with, based on the signal level of the broadcast channel 18 received at the ISU 26. For example, an ISU 26 located within a center region of a cell will probably choose to communicate with the satellite 12 associated with the cell, because the broadcast channel 18 signal level of an antenna pattern is generally the greatest in the center region. If an ISU 26 is located within a region where two antenna patterns or cells overlap, ISU 26 may choose either cell to communicate with, because the broadcast channel 18 signal levels are generally similar.

A handoff candidate list is typically generated in advance by a GW 22. GW 22, by knowing the current geometric relationship between cells and the cell shut-down plan, predicts which candidate cells a given ISU 26 can utilize.

GW 22 transfers the time-sequenced handoff candidate list for each cell served by a satellite 12 to each of the satellites 12, which in turn transmits the appropriate list to the ISUs 26 in each of its cells. The ISUs 26 update their candidate list by observing differences between the broadcast channels 18 identified in the handoff candidate update messages and the broadcast channels 18 transmitted in previously provided candidate lists. Whether or not a channel in the current list remains valid is indicated by the current satellite 12 in the candidate update messages.

A handoff request typically includes the candidate cell (e.g., the cell that the ISU 26 wants to transfer its communication). When the satellite 12 receives the handoff request from the ISU 26, the satellite 12 first determines if it also services the requested candidate cell. In inter-cell handoff, the requested candidate cell is serviced by the satellite 12. The satellite 12 places the new uplink and downlink traffic channel assignment into a control field of the next downlink burst to the requesting ISU 26. When the ISU 26 receives the new assignment, it waits until it has received all of the downlink burst and has sent the corresponding uplink burst. The ISU 26 then tunes to the new traffic channel. Next, the satellite 12 directs the traffic for the requesting ISU 26 to the new channel. Since both the old and new channels are on the same satellite 12, the Doppler and timing offsets are the same for both cells at the time of the handoff and the ISU 26 can synchronize immediately. Following the handoff, the ISU 26 discards its current handoff candidate list and the satellite 12 provides a handoff candidate list for the new cell.

A GW 22 is typically responsible for routing the calls from a dialing ISU 26 to a receiving ISU 26. Those skilled in the art will readily recognize that there is no requirement that the handoff control functions be performed in a GW 22. These functions can, for example, be performed in SCS 28 or in any one or a combination of satellites 12 (of FIG. 1).

In a typical satellite communication system, that provides voice services, a message is sent to an ISU 26 before the ISU 26 is dropped. This allows the ISU 26 to look for another broadcast channel in which to switch, on the same or another satellite 12. As discussed above, the ISU 26 determines which cell or satellite 12 to request based on the highest quality broadcast channel signal received. In a typical satellite communication system 10, a channel release warning message is sent to the ISU 26, e.g., a handset, when a beam is about to be turned off. As is well known to one of ordinary skill in the art, a beam may be turned off, such that only single coverage is maintained. In this manner, a typical satellite communication system attempts to prevent double coverage, which wastes power and frequency spectrum.

Typically, one broadcast channel and three to eight acquisition channels are provided per satellite beam. In a typical system, the broadcast channel and the acquisition channels are on a set frequency access of a basic channel frequency. For example, each cell may be assigned a basic reuse unit that includes a set of eight channels and four time-slots, e.g., time-slot one (TS1) through time-slot four (TS4).

Split Band Channel Assignments

In some regions, additional frequency spectrum can be utilized for providing a downlink for high-speed data services. That is, providing that a particular communication system does not interfere with various other users, e.g., radio astronomy or other primary license holders in a secondary service band. As is well known to one of ordinary skill in the art, high-speed data services implemented in satellite communication systems require substantially more downlink bandwidth than uplink bandwidth, in the primary service band. This is because high-speed data is typically uplinked in the Ka-band, whereas high-speed data is normally downlinked in the L-band, e.g., the primary service band. Most satellite communication systems use the Ka-band for communication between ground stations (e.g., gateways and system control segments) and the satellites and, as such, any data that is to be downloaded to a high-speed data terminal is routed via a gateway to one or more satellites, and therefore is uploaded in the Ka-band.

According to the present invention, a subscriber utilizing a high-speed data terminal (i.e., represented by ISU 26) that is attempting to download data from a web server typically uplinks very minimal data, e.g., uniform resource locator (URL) type requests, on the uplink of the air interface (i.e., in the primary service band). The uplink URL request is typically routed across the constellation of satellites and down to a gateway in the Ka-band. The gateway directs the request to an appropriate web server. The web server provides the requested data which is transferred to an appropriate gateway and uplinked in the Ka-band to a satellite, or through a constellation of satellites via cross-links. The requested data is eventually downlinked in a secondary service band of the L-band frequency spectrum. In this manner, any information that a user of a high-speed data terminal downloads does not consume spectrum in the primary service band.

Figure 2:
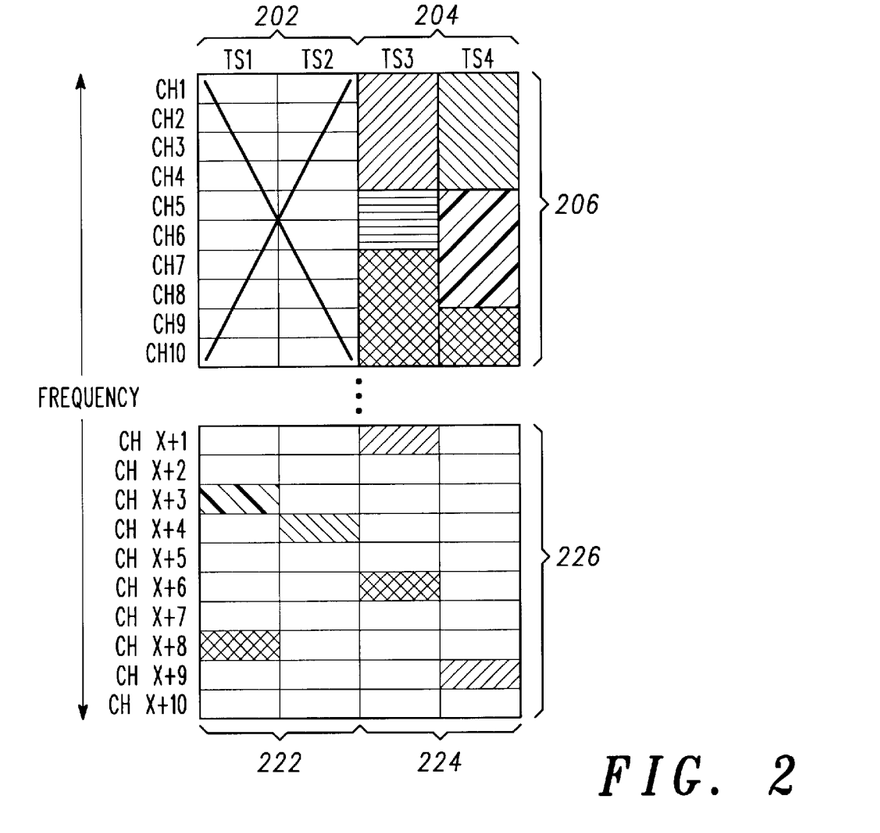
FIG. 2 is a diagram of an asymmetric channel assignment technique implemented with the narrowband communication system of FIG. 1.

FIG. 2 illustrates how a secondary service band 206 is utilized in conjunction with a primary service band 226 to provide a downlink for wideband data services. As shown, channels CH1–CH10 provide downlink wideband data services in time-slots three and four (TS3 and TS4) of the secondary service band 206. Data in TS3 and TS4 of CH1–CH10 provides high-speed data to a plurality of high-speed data terminals (e.g., ISUs 26). As shown in FIG. 2, time-slots one and two (TS1 and TS2) form an uplink 202 in the secondary service band 206 that is not utilized by the communication system 10. Utilizing downlink 204, in the secondary service band 206, allows the system 10 to offload the downloading of wideband data from the primary service band 226. Channels CH(X+1)–CH(X+10) of the primary service band 226 provide an uplink 222 in the primary service band 226. This uplink is utilized for narrowband services and to uplink requests from high-speed data terminals. Time-slots TS3 and TS4 of channels CH(X+1)–CH(X+10) provide a downlink 224 for narrowband services in the primary service band 226.

As previously discussed, the uplink 202 of the secondary service band 206 is generally not available. As shown, wideband services are provided to a total of five high-speed data subscribers in the secondary service band 206. A first subscriber receives data on contiguous channels CH1–CH4 in TS3. A second subscriber receives data on channels CH5–CH6 in TS3. A third subscriber receives data on channels CH7–CH10 in TS3 and on channels CH9–CH10 in TS4. A fourth subscriber receives data on CH1–CH4 in TS4. A fifth subscriber receives data on CH5–CH8 in TS4. As previously stated, offloading wideband services to the downlink 204 of the secondary service band 206 conserves frequency spectrum in the primary service band 226. This is advantageous in that it minimizes the impact on capacity for primary services, e.g., voice services.

In summary, the primary service band 226 is used to provide an uplink and a downlink for primary services and to provide an uplink for high-speed data terminal services (e.g., URL type requests). Thus, every channel assignment in the primary service band looks like a narrowband channel, which tends to reduce channel assignment allocation conflicts. All wideband channel assignments are preferably made in the secondary service band 206, which limits the impact on primary services in peak traffic regions in that the primary service band 226 is not required to download the data from the communication node, e.g., satellite, to a high-speed data terminal, e.g., an ISU 26.

Pseudo Brake-before-make Handoffs

Due to the limited bandwidth of narrowband communication systems, it is difficult to find contiguous spectrum in which to allocate channels in a handoff cell (i.e., a new cell) such that true make-before-break handoffs can be accomplished. In particular, if there are more than a few high-speed data terminal subscribers in a local region, the task becomes virtually impossible. According to the present invention, a handoff protocol rate negotiates a channel bandwidth of an active connection to the number of available channels in a new cell (e.g., one channel), when the number of available channels is less than the number of channels allocated to the active connection.

For example, if a high-speed data terminal in a current cell is utilizing four channels, and only two channels are available in a handoff cell, the channels utilized in the current cell are rate negotiated to only two cells. One of ordinary skill in the art will appreciate, upon reading the disclosure herein, that it is desirable for both ends of the connection to be involved in the rate negotiation process. After the channel bandwidth is minimized in the current cell, the freed channel resources can be reallocated by the satellite. After handoff, the high-speed data terminal can then rate negotiate its channel allocation back up to, in this example, four channels.

Figure 3A:
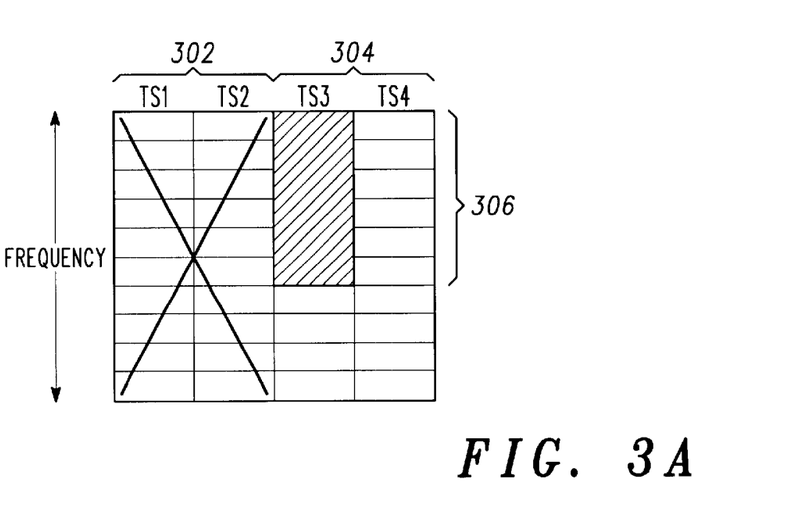
FIGS. 3A–3C are diagrams illustrating a handoff protocol that rate negotiates a channel bandwidth of an active connection in a current cell to the number of channels that are available in a handoff cell (e.g., one channel) implemented with the narrowband communication system of FIG. 1.
Figure 3B:
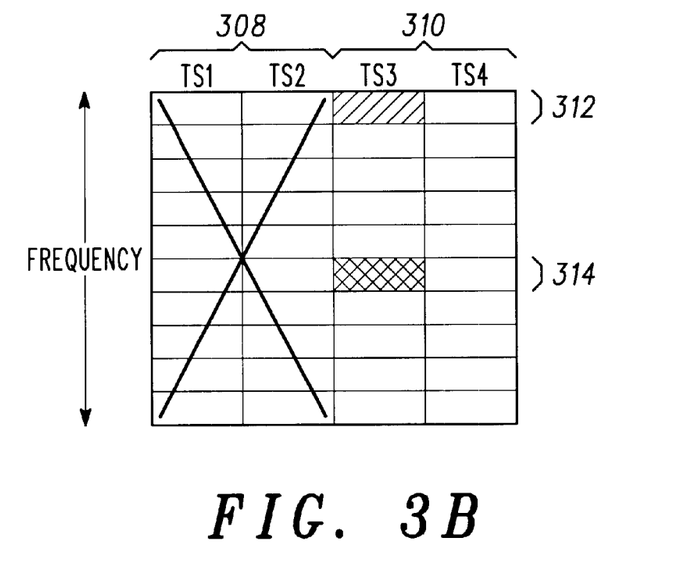
Figure 3C:
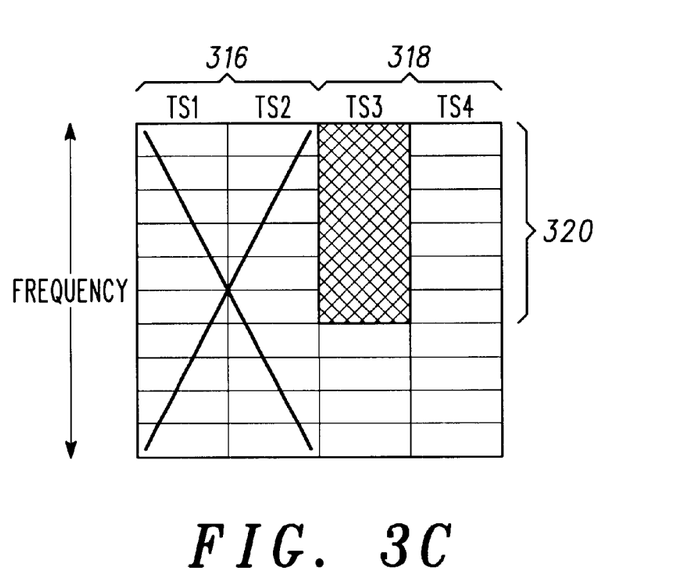

As shown in FIGS. 3A–3C, uplinks 302, 308 and 316 of a secondary service band are not utilized, while downlinks 304, 310 and 318 of the secondary service band are used to download high-speed data. In FIG. 3A, before handoff, a high-speed data terminal is utilizing six contiguous channels 306 in TS3 of a current cell. Prior to handoff, as shown in FIG. 3B, the six contiguous channels 306 are rate negotiated to a single channel 312 in TS3 of the current cell and a single channel 314 in TS3 of a handoff cell. After handoff, as shown in FIG. 3C, the high-speed data terminal has rate negotiated its assigned channels back to six contiguous channels 320 of the handoff cell. One of ordinary skill in the art will appreciate that channel assignments, other then contiguous channels, can be made. One of ordinary skill in the art will also readily appreciate that channels can be contiguous in both frequency and time.

Preferably, a single handoff request is processed to handoff all involved channels. Utilizing a single handoff request generally reduces the processing required to complete the handoff of the channels.

Technique for Preemption

A high-speed data terminal, utilized with a narrowband system, may, for example, function as a mobile office terminal, an aeronautical safety data terminal and/or a remote test station telemetry terminal. As previously mentioned, many high-speed data terminals require a guaranteed bandwidth, because of the application in which they are used. For example, U.S. government regulations require a guaranteed bandwidth for a communication system that offers aeronautical safety data. On the other hand, applications, such as, remote test station telemetry, may prefer to purchase airtime at a lower cost with a corresponding limitation on the availability of communication resources, e.g., on a non-interfering basis with primary subscriber services. As such, a preemption technique that allows a communication system to provide premium services, is desirable.

According to an embodiment of the present invention, a special acquisition class designation is utilized such that a high-speed data terminal identifies its terminal type and application requirements in an acquisition message. An acquisition message from a high-speed data terminal utilizes priority bits to identify preemption requirements. In a typical application, these priority bits are passed to a serving gateway, which is responsible to convey the information to each satellite that is serving a particular area before channel resources are assigned. In a preferred embodiment, special acquisition and handoff queues are provided within a given satellite to ensure priority processing for high-priority high-speed data terminals.

Another aspect of the present invention is directed to ensuring that higher priority terminals are always allowed onto the system. In this situation, it may be necessary to preempt current subscriber services to provide communication channels for the high priority terminals. Preferably, low priority high-speed data terminals are preempted before premium subscriber services, e.g., voice services. An example of a typical low priority terminal is a remote test station telemetry terminal, which may be located adjacent oil pipelines, oil rigs and other structures. This type of terminal typically collects telemetry data and receives control data from a central controller.

Figure 4:
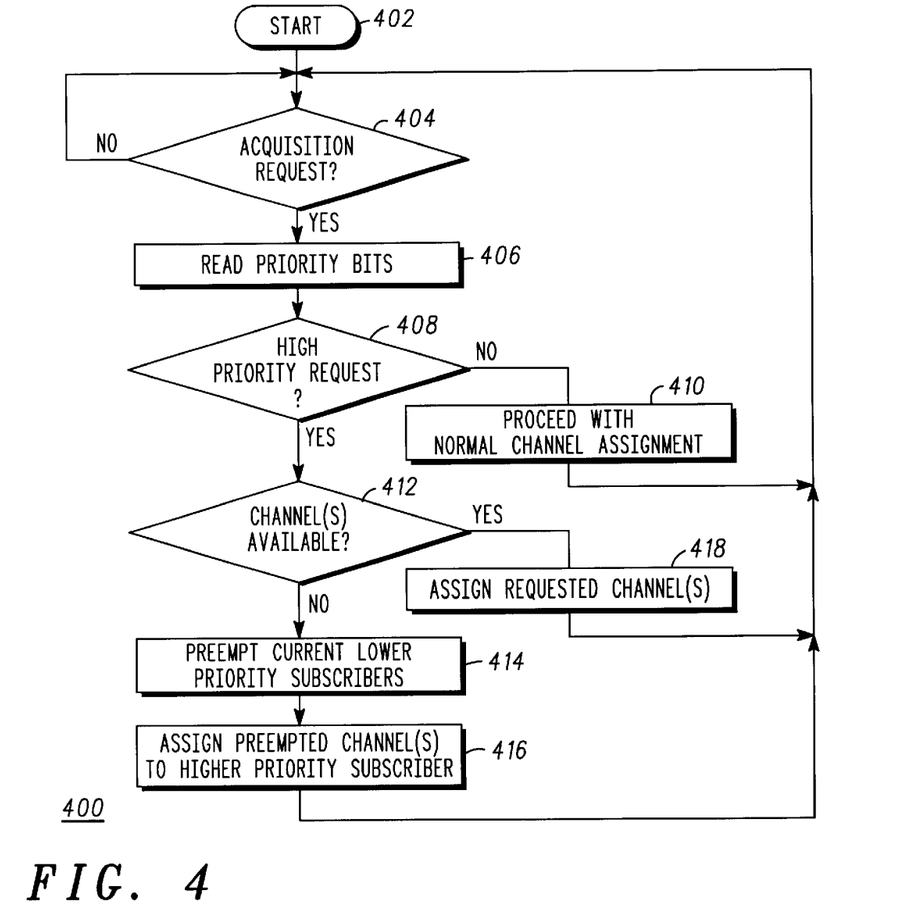
FIG. 4 is flowchart of a preemption routine that utilizes special acquisition class designations in an acquisition message to provide priority access to the narrowband communication system of FIG. 1.

Turning to FIG. 4, illustrated is a flowchart of a preemption routine 400 that utilizes special acquisition class designations, in an acquisition message, to provide high-speed data terminals priority access to a narrowband communication system. In step 402, routine 400 is initialized. Next, in decision step 404, routine 400 determines whether an acquisition request has been received. If so, control transfers from step 404 to step 406. Otherwise, control loops on decision step 404. In step 406, routine 400 reads the priority bits of the acquisition message. From step 406, control transfers to decision step 408, where routine 400 determines whether a high priority request had been received. If so, control transfers from step 408 to step 412. Otherwise, control transfers from step 408 to step 410. In step 410, routine 400 proceeds with normal channel assignment, at which point control returns to decision step 404.

In decision step 412, routine 400 determines whether channels are available to service the high priority request. If so, control transfers from decision step 412 to step 418. In step 418, routine 400 assigns the requested channels to the high-speed data terminal, at which point control returns to step 404. If enough channels are not available to service the high-speed data terminal, in decision step 412, control transfers to step 414. In step 414, routine 400 may cause information to be temporarily stored within special acquisition and/or handoff queues provided within a given satellite 12, which ensure priority processing for high-priority high-speed data terminals. When required, lower priority subscribers are preempted such that a requested amount of channels can be provided to the high-speed data terminal. Next, in step 416, routine 400 assigns the preempted channels to the higher priority subscriber. From step 416, control transfers to step 404.

In summary, a routine has been described which allows a high-speed data terminal priority access to a narrowband communication system.

Channel Assignment to Minimize High-speed data Terminal Complexity

When designing high-speed data terminals, the complexity of the high-speed data terminal communication chipset can be reduced if a receiver, located within the high-speed data terminal, utilizes contiguous channels. This reduces the range of frequencies that the receiver must sweep and demodulate (during a guard slot), and typically reduces the complexity of the receiver. One receiver design utilizes a single time-slot of multiple contiguous channels. Another receiver design utilizes multiple time-slots of multiple contiguous channels. As an example, a system that implements twelve channels and four time-slots can be serviced by a receiver that utilizes three channels when each of four time-slots (e.g., TS1, TS2, TS3 and TS4), associated with each channel, is utilized. Utilizing this design, only three demodulators are required. If a different channel is utilized for each of the twelve channels, then each channel must have to have its own demodulator (which would require twelve demodulators).

One of ordinary skill in the art, will readily appreciate that a three channel demodulator is considerably less complex than a twelve channel demodulator. As such, a technique, which prefers channel assignments with the same frequency access and adjacent time-slots, is desirable.

Figure 5:
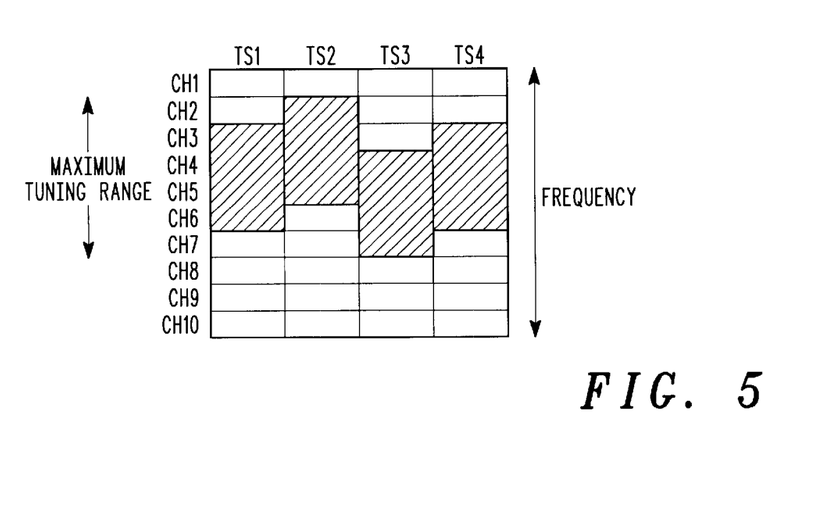
FIG. 5 is a diagram illustrating how channel assignments for high-speed data terminals can be made to reduce the complexity of a high-speed data terminal communication chipset.

Turning to FIG. 5, an assignment scheme, which requires a receiver to have a maximum tuning range of six channels (i.e., channels CH2 through CH7), is shown. In this example, channels CH3–CH6 are utilized to transfer information during TS1. Between TS1 and TS2, the receiver retunes all channels to an adjacent channel. Between TS2 and TS3, a high-speed data terminal receiver retunes all channels by two channels. Between TS3 and TS4, the receiver of the high-speed data terminal retunes all channels to an adjacent channel. In summary, utilizing adjacent time-slots reduces the required tuning range of a given receiver. However, as noted above, eliminating retuning between time-slots is desirable in that a minimum number of channels have to be demodulated and no retuning is required between time-slots. This allows the number of channels in a given high-speed data terminal receiver to be reduced.

In a typical satellite system, a minimal channel allocation that is typically made on a per beam basis is a reuse unit. To mitigate interference when assigning frequencies for a high-speed data terminal, it may be desirable to assign channels from different reuse units, such that if a time-slide occurs, not all of the assigned channels will have interference. One of ordinary skill in the art will readily appreciate that such an implementation increases the frequency range that a given receiver must be capable of tuning.

While principles of the invention have been described above in connection with specific apparatus, it is to be clearly understood that this description is made only by way of example and not as a limitation on the scope of the invention.

What is claimed is:

1. A method for providing high-speed data services in a narrowband communication system, the narrowband communication system communicating with a high-speed data terminal and at least one communication node, the method comprising the steps of:

dividing an available communication frequency spectrum into a primary service band and a secondary service band, wherein the available communication frequency spectrum is a narrowband frequency spectrum;

assigning narrowband uplink channel, narrowband downlink channels and uplink channels associated with the high-speed data terminal to the primary service band; and assigning wideband downlink channels associated with the high-speed data terminal to the secondary service band.

2. The method of claim 1, wherein the at least one communication node includes a plurality of satellites and gateways.

3. The method of claim 1, wherein the wideband downlink channels are assigned to a single time-slot of multiple contiguous channels for each high-speed data terminal.

4. The method of claim 1, wherein the wideband downlink channels are assigned to multiple time-slots of multiple contiguous channels for each high-speed data terminal.

5. The method of claim 1, wherein the wideband downlink channels are assigned to multiple time-slots of a single channel for each high-speed data terminal.

6. The method of claim 1, further including the steps of:
making a handoff request for a plurality of current cell channels that are providing a wideband service for the high-speed data terminal;
rate negotiating an active connection in a current cell to a number of available handoff cell channels when the plurality of current cell channels are not available;
transferring communication traffic from the current cell to a handoff cell; and
rate negotiating an active connection in the handoff cell such that a number of assigned handoff cell channels is approximately equal to the plurality of current cell channels.

7. The method of claim 6, wherein the multiple channels are contiguous channels.

8. The method of claim 6, wherein the handoff request is a single handoff request.

9. The method of claim 6, wherein the multiple channels are wideband downlink channels.

10. The method of claim 1, further comprising the steps of:
assigning a priority to the high-speed data terminal;
providing an acquisition message over an acquisition channel from the high-speed data terminal to the at least one communication node, the acquisition message including a special acquisition class designation that designates a priority of the high-speed data terminal; and
assigning channel resources based upon the special acquisition class designation, wherein a higher priority terminal preempts a lower priority terminal if required for a higher priority terminal to access the narrowband communication system.

11. The method of claim 10, wherein the special acquisition class designation includes a data terminal type and a data terminal application for the high-speed data terminal.

12. A method for handing-off multiple channels assigned to a high-speed data terminal in a narrowband communication system, the narrowband communication system communicating with a high-speed data terminal and at least one communication node, the method comprising the steps of:
making a handoff request for a plurality of current cell channels that are providing a wideband service for the high-speed data terminal via the narrowband communications system;
rate negotiating an active connection in a current cell to a number of available handoff cell channels when the plurality of current cell channels are not available;
transferring communication traffic from the current cell to a handoff cell within the narrowband communications system; and
rate negotiating an active connection in the handoff cell such that a number of assigned handoff cell channels is approximately equal to the plurality of current cell channels.

13. The method of claim 12, wherein the multiple channels are contiguous channels.

14. The method of claim 12, wherein the handoff request is a single handoff request.

15. The method of claim 12, wherein the multiple channels are wideband downlink channels.

16. A narrow-band communication system that provides high-speed data services, the narrowband communication system comprising:
a high-speed data terminal; and
at least one communication node in communication with the high-speed data terminal, the at least one communication node performing the steps of:
dividing an available communication frequency spectrum into a primary service band and a secondary service band wherein the available communication frequency spectrum is a narrowband frequency spectrum;
assigning narrowband uplink channels, narrowband downlink channels and uplink channels associated with the high-speed data to the primary service band; and
assigning wideband downlink channels associated with the high-speed data terminal to the secondary service band.

17. The narrowband communication system of claim 16, wherein the at least one communication node includes a plurality of satellites and gateways.

18. The narrowband communication system of claim 16, wherein the wideband downlink channels are assigned to a single time-slot of multiple contiguous channels for each high-speed data terminal.

19. The narrowband communication system of claim 16, wherein the wideband downlink channels are assigned to multiple time-slots of multiple contiguous channels for each high-speed data terminal.

20. The narrowband communication system of claim 16, wherein the wideband downlink channels are assigned to multiple time-slots of a single channel for each high-speed data terminal.

21. The narrowband communication system of 16, further including the steps of:
making a handoff request for a plurality of current cell channels that are providing a wideband service for the high-speed data terminal;
rate negotiating an active connection in a current cell to a number of available handoff cell channels when the plurality of current cell channels are not available;
transferring communication traffic from the current cell to a handoff cell; and
rate negotiating an active connection in the handoff cell such that a number of assigned handoff cell channels is approximately equal to the plurality of current cell channels.

22. The narrowband communication system of claim 21, wherein the multiple channels are contiguous channels.

23. The narrowband communication system of claim 21, wherein the handoff request is a single handoff request.

24. The narrowband communication system of claim 21, wherein the multiple channels are wideband downlink channels.

25. The narrowband communication system of claim 16, further comprising the steps of:

assigning a priority to the high-speed data terminal;

providing an acquisition message over an acquisition channel from the high-speed data terminal to the at least one communication node, the acquisition message including a special acquisition class designation that designates a priority of the high-speed data terminal; and assigning channel resources based upon the special acquisition class designation, wherein a higher priority terminal preempts a lower priority terminal if required for a higher priority terminal to access the narrowband communication system.

26. The narrowband communication system of claim 25, wherein the special acquisition class designation includes a data terminal type and a data terminal application for the high-speed data terminal.

* * * * *